United States Patent [19]

Resler, Jr.

[11] 4,105,008
[45] Aug. 8, 1978

[54] ANTI-POLLUTION PISTON CONSTRUCTION

[75] Inventor: Edwin L. Resler, Jr., Ithaca, N.Y.

[73] Assignee: Cornell Research Foundation, Inc., Ithaca, N.Y.

[21] Appl. No.: 610,296

[22] Filed: Sep. 4, 1975

[51] Int. Cl.² .............................................. F02F 1/24
[52] U.S. Cl. ........................... 123/191 R; 123/193 P; 92/181 R
[58] Field of Search .................... 123/32 B, 37, 32 E, 123/193 P, 191 R; 92/181 R, 181 P

[56] References Cited

U.S. PATENT DOCUMENTS

| | | | |
|---|---|---|---|
| 1,320,064 | 10/1919 | Junkers | 123/191 R |
| 1,633,385 | 6/1927 | Moore | 123/37 |
| 1,811,771 | 6/1931 | Wiemann | 123/37 |
| 2,173,081 | 9/1939 | Barkeij | 123/32 B |
| 2,359,672 | 10/1944 | Penco | 123/193 CP X |
| 2,446,280 | 8/1948 | Hancock | 123/193 P X |
| 3,224,426 | 12/1965 | Franca | 123/37 X |
| 3,667,443 | 6/1972 | Currie et al. | 123/193 P |
| 3,776,212 | 12/1973 | Karlowitz | 123/32 SA |
| 3,831,952 | 8/1974 | Geoffroy | 92/181 R |
| 3,919,982 | 11/1975 | Goto et al. | 123/193 P X |

*Primary Examiner*—Charles J. Myhre
*Assistant Examiner*—Craig R. Feinberg

[57] ABSTRACT

An anti-pollution piston construction is disclosed containing at least one storage chamber having inlet orifices contained in the periphery of the cylindrical side wall of the piston adjacent the imperforate piston end wall, said storage chamber being adapted to receive unburnt hydrocarbons during the compresstion stroke of the engine. During the expansion stroke following ignition, the unburnt hydrocarbons are returned to the cylinder chamber for mixing with the combustion gases to reduce the oxides of nitrogen having an excess concentration relative to an equilibrium value which is a function of the temperature, pressure and composition parameters of the combustion gases. The unburnt hydrocarbons in the storage chamber are returned in a manner that displaces unburnt hydrocarbons from the relatively cold wall of the cylinder which further aids the reduction of the oxides of nitrogen. In one embodiment, a plurality of radially arranged circumferentially spaced storage chambers are provided in the cylindrical side wall of the pistion. In another embodiment, a centrally arranged storage chamber is provided which communicates with the cylinder chamber via radially arranged circumferentially spaced passages having orifices in the periphery of the piston.

2 Claims, 4 Drawing Figures

ANTI-POLLUTION PISTON CONSTRUCTION

REFERENCE TO COPENDING APPLICATION

The present invention relates to a similar application of an improved anti-pollution internal combustion engine of the reciprocatory piston spark plug ignition type disclosed in my prior U.S. application Ser. No. 449,391 filed Mar. 8, 1974, which in turn is a continuation-in-part of the parent application Ser. No. 399,498 filed Sept. 21, 1973, both applications being abandoned.

BRIEF DESCRIPTION OF THE PRIOR ART

As evidenced by the prior patents to Myerson U.S. Pat. Nos. 3,867,507, Kim 3,513,929 and Reed et al 3,873,671, among others, various methods and apparatus have been proposed for reducing pollutants from the exhaust gases of internal combustion engines or the like.

In my aforementioned U.S. patent application Ser. No. 449,391 filed Mar. 8, 1974, now abandoned in favor of the continuation-in-part application Ser. No. 770,353 filed Feb. 22, 1977, a method and apparatus are disclosed for reducing undesirable oxides of nitrogen having an excess concentration relative to an equilibrium condition determined by the temperature, pressure and composition parameters of the combustion gases, wherein unburnt hydrocarbons are mixed with the oxides of nitrogen at a temperature of at least 2200 degrees Rankine, thereby to reduce the oxides of nitrogen to the equilibrium value. Various embodiments are disclosed of internal combustion engines containing storage chambers in communication with the cylinders for receiving unburnt hydrocarbons during a compression stroke and for returning the hydrocarbons to the cylinder during the expansion stroke following combustion, whereby the unburnt hydrocarbons mix with the oxides of nitrogen and the reduction temperature is provided by the gases within the cylinder. In the disclosed embodiments, the storage chambers are contained in the pistons, in the walls of the cylinders or the head, or in the spark plugs of the internal combustion engine.

SUMMARY OF THE INVENTION

A primary object of the present invention is to provide an improved anti-pollution piston construction for internal combustion engines containing at least one storage chamber, and at least one orifice contained in the peripheral wall of the piston adjacent the imperforate end wall thereof affording communication between the storage chamber and the cylinder chamber, whereby hydrocarbons are stored in the storage chamber during the compression stroke and are returned to the cylinder chamber during the expansion stroke following ignition, thereby to reduce the oxides of nitrogen to the equilibrium value.

A more specific object of the invention is to provide an anti-pollution piston having a plurality of radially arranged circumferentially spaced storage chambers contained in the periphery of the side wall of the piston.

Another object of the invention is to provide an anti-pollution piston containing a centrally arranged storage chamber, and a plurality of passages having circumferentially spaced orifices contained in the periphery of the piston for affording communication between the storage chamber and the working chamber of the cylinder.

A further object of the invention is to provide an anti-pollution piston of the type described above, including seal means slidably mounted in an annular control groove formed in the periphery of the piston for controlling the orfice size to the storage chamber during reciprocatory movement of the piston.

DETAILED DESCRIPTION OF THE DRAWING

Other objects and advantages of the invention will become apparent from a study of the following specification when viewed in the light of the accompanying drawing, in which.

DETAILED DESCRIPTION

Figure 1:
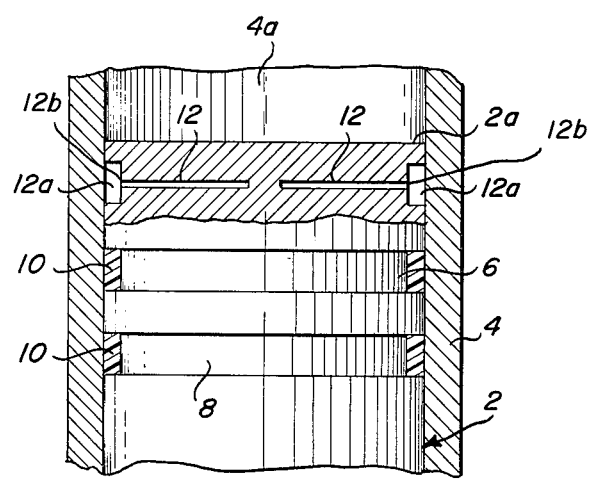
FIG. 1 is a detailed partially sectioned elevational view of a first embodiment of the anti-pollution piston of the present invention.
Figure 2:
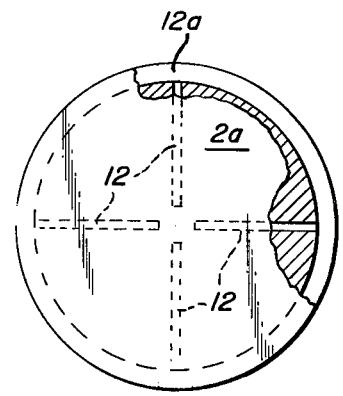
FIG. 2 is a plan view of the piston of FIG. 1.

Referring first more particularly to FIGS. 1 and 2, the piston 2 is adapted for reciprocatory movement in the cylinder 4 of an internal combustion engine, said piston having at one end an imperforate end wall 2a and being adapted for connection at its other end with a connecting rod, not shown. The piston is provided with conventional annular grooves 6 and 8 for receiving piston rings 10, as is known in the art.

In accordance with the present invention, the peripheral side wall portion of the piston adjacent the piston end wall 2a is provided with a plurality of circumferentially spaced radially arranged storage compartments 12 extending from groove 12a. These storage chambers are in continuous communication with the cylinder chamber 4a, so that during the compression stroke of the engine, unburnt hydrocarobons are introduced into the storage chambers 12 via the orifices 12b and are stored therein. During the subsequent expansion stroke of the piston following combustion, the unburnt hydrocarbons are introduced into the cylinder chamber 4a for mixing with the combustion gases. The unburnt hydrocarbons are introduced so their jetting action scours the walls and removes unburned hydrocarbons from the walls and introduces them also into the combustion gases. Owing to the high temperature in the cylinder chamber (i.e., at least 2200° Rankine), the undesirable oxides of nitrogen having an excess concentration relative to an equilibrium condition determined by the pressure, temperature and composition parameters of the combustion gases are reduced to the equilibrium value, thereby reducing pollution of the atmosphere by the engine.

Figure 3:
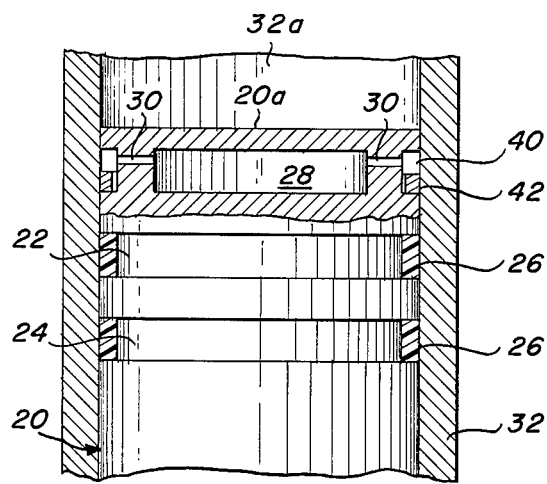
FIGS. 3 and 4 are partially sectioned side elevation and top plan views, respectively, of another piston embodiment of the invention.
Figure 4:
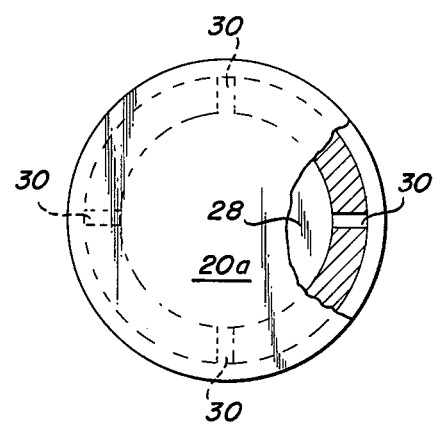

Referring now to the embodiment of FIGS. 3 and 4, the piston 20 having an imperforate end wall 20a is again provided with annular grooves 22 and 24 for receiving piston rings 26, as is conventional in the art. In this embodiment, the piston contains a centrally arranged storage chamber 28 adjacent the piston end wall 20, and radially arranged passages 30 that afford communication between the storage chamber 28 and the chamber 32a of cylinder 32. Continuous communication is normally afforded between the chambers 32a and 28 via passages 30, whereupon unburnt hydrocarbons are stored in the storage chamber 28 during the compression stroke and are returned to the cylinder chamber during the expansion stroke following ignition, thereby reducing the oxides of nitrogen to the equilibrium value as described above.

According to a modification of the invention, slidable seal means may be provided in control grooves associated with either of the embodiments of FIGS. 1 and 3 for controlling the communication between the storage chamber and the cylinder chamber. More particularly, in the embodiment of FIGS. 3 and 4, the annular control groove 40 has a bottom wall that contains the orifices of passages 30, annular perforated ring 42 being axially shiftable in the control groove 40. The perforations in ring 42 cause equalization of pressure on the top and bottom sides of ring 42 thereby permitting movement of the ring 42 in groove 40. Consequently, during upward movement of the piston 20 during the compression stroke, seal 42 is in its downward open position, and chambers 32a and 28 are in communication via paasages 30. After the piston reaches top dead center and commences downward movement during the expansion stroke, the seal is displaced to its upper position to regulate flow out of passages 30, whereby chambers 28 and 32a are in communication during the expansion stroke, thereby returning unburnt hydrocarbons to the chamber 32a to reduce the oxides of nitrogen to the equilibrium value as described above.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. An anti-pollution internal combustion engine of the type including ignition means for igniting a combustible hydrocarbon fuel-air mixture, comprising
   (a) A cylinder having an inner wall surface;
   (b) a cylindrical piston mounted for reciprocation in said cylinder, said piston having at one end an imperforate continuous end wall which cooperates with said cylinder to define a combustion chamber, and a cylindrical side wall of said piston containing at least one piston ring groove.
   (c) a piston ring mounted concentrically within said piston ring groove, the outer periphery of said piston ring being in contiguous engagement with the inner wall surface of said cylinder; and
   (d) storage means contained solely within said piston for receiving from the combustion chamber unburnt hydrocarbons during the compression stroke of the engine and for returning the unburnt hydrocarbons to the engine cylinder during the subsequent expansion stroke following ignition of the fuel, said storage means including
      (1) a second groove contained in the cylindrical side wall of said piston intermediate said piston ring groove and said imperforate end wall, said second groove being in continuous communication with said combustion chamber via the annular space between the end extremity of said piston and the wall surface of said cylinder;
      (2) at least one storage chamber contained in said piston;
      (3) means including a plurality of radial passages and orifices affording communication between said storage chamber and said second groove, whereby during the expansion stroke following ignition, the unburnt hydrocarbons are returned to the engine cylinder so that their jetting action scours the inner wall surface of said cylinder and removes additional unburnt hydrocarbons from the wall, and introduces unburnt hydrocarbons from the storage chamber and the wall into the combustion gases for mixing with the oxides of nitrogen to reduce said oxides to the equilibrium value; and
      (4) an annular seal member mounted for axial sliding movement between open and restricting positions relative to said orifices, thereby to vary the effective size of said orifices.

2. An anti-pollution internal combustion engine of the type including ignition means for igniting a combustible hydrocarbon fuel-air mixture, comprising
   (a) a cylinder having an inner wall surface;
   (b) a cylindrical piston mounted for reciprocation in said cylinder, said piston having at one end an imperforate continuous end wall which cooperates with said cylinder to define a combustion chamber, and a cylindrical side wall of said piston containing at least one piston ring groove;
   (c) a piston ring mounted concentrically within said piston ring groove, the outer periphery of said piston ring being in contiguous engagement with the inner wall surface of said cylinder; and
   (d) a storage chamber contained solely with in said piston for receiving from the combustion chamber unburnt hydrocarbons during the compression stroke of the engine and for returning the unburnt hydrocarbons to the engine cylinder during the subsequent expansion stroke following ignition of the fuel so that their jetting action scours the inner wall surface of said cylinder and removes additional unburnt hydrocarbons from the wall, and introduces unburnt hydrocarbons from the storage chamber and the wall into the combustion gases for mixing with the oxides of nitrogen to reduce said oxides to the equilibrium value, said storage chamber including
      a plurality of circumferentially spaced radial passages above the piston ring affording communication between said storage chamber and said combustion chamber.

* * * * *